(12) United States Patent
Jin

(10) Patent No.: US 7,995,517 B2
(45) Date of Patent: Aug. 9, 2011

(54) SYSTEM AND METHOD FOR TRANSMITTING UNITS OF MESSAGES IN A MOBILE COMMUNICATION SYSTEM

(75) Inventor: Jong-Hyun Jin, Seoul (KR)

(73) Assignee: LG Electronics Inc., Seoul (KR)

( * ) Notice: Subject to any disclaimer, the term of this patent is extended or adjusted under 35 U.S.C. 154(b) by 877 days.

(21) Appl. No.: 11/087,158

(22) Filed: Mar. 22, 2005

(65) Prior Publication Data

US 2005/0213533 A1 Sep. 29, 2005

(30) Foreign Application Priority Data

Mar. 24, 2004 (KR) ........................ 10-2004-0020129
Mar. 9, 2005 (KR) ........................ 10-2005-0019762

(51) Int. Cl.
*H04W 4/00* (2009.01)
*H04L 12/28* (2006.01)

(52) U.S. Cl. ...................................... 370/328; 370/394

(58) Field of Classification Search .................. 714/748; 370/401, 352, 394, 326–328, 252, 474
See application file for complete search history.

(56) References Cited

U.S. PATENT DOCUMENTS

| | | | |
|---|---|---|---|
| 5,185,795 A | 2/1993 | Bright | |
| 6,556,586 B1 * | 4/2003 | Sipila | 370/469 |
| 6,621,796 B1 * | 9/2003 | Miklos | 370/236 |
| 6,643,813 B1 * | 11/2003 | Johansson et al. | 714/748 |
| 7,359,403 B1 * | 4/2008 | Rinne | 370/469 |
| 2001/0014908 A1 | 8/2001 | Lo et al. | |
| 2002/0080802 A1 * | 6/2002 | Sachs et al. | 370/401 |
| 2002/0093928 A1 | 7/2002 | LoGalbo et al. | |
| 2002/0143805 A1 * | 10/2002 | Hayes et al. | 707/500 |
| 2002/0191544 A1 * | 12/2002 | Cheng et al. | 370/236 |
| 2003/0169741 A1 * | 9/2003 | Torsner et al. | 370/394 |
| 2004/0165538 A1 * | 8/2004 | Swami | 370/252 |
| 2004/0170161 A1 * | 9/2004 | Laumen et al. | 370/352 |

FOREIGN PATENT DOCUMENTS

| | | |
|---|---|---|
| CN | 1437368 | 8/2003 |
| EP | 1056258 | 11/2000 |
| JP | 56-123150 | 9/1981 |
| JP | 63-042534 | 2/1988 |
| JP | 06-303277 | 10/1994 |
| JP | 08-079331 | 3/1996 |
| JP | 09-153924 | 6/1997 |
| JP | 10-229429 | 8/1998 |
| JP | 2000-115142 | 4/2000 |
| JP | 2000-165578 | 6/2000 |
| JP | 2001-111618 | 4/2001 |
| JP | 2001-169004 | 6/2001 |
| JP | 2002-232400 | 8/2002 |
| WO | 03/017560 | 2/2003 |

* cited by examiner

*Primary Examiner* — Michael T Thier
(74) *Attorney, Agent, or Firm* — Lee, Hong, Degerman, Kang & Waimey

(57) ABSTRACT

A method of multimedia communication in a mobile communications network is provided. The method comprises allocating data in a message to be transmitted via a multimedia messaging service (MMS) protocol to a sequence of protocol data units (PDU), wherein each PDU in the sequence is associated with a sequence number identifying the position of the PDU in said sequence; transmitting a first PDU in said sequence; transmitting a subsequent PDU in the sequence according to the PDU's sequence number, in response to an acknowledgment received confirming receipt of a previously transmitted PDU; retransmitting a PDU if a respective acknowledgement is not received for the PDU.

10 Claims, 4 Drawing Sheets

US 7,995,517 B2

SYSTEM AND METHOD FOR TRANSMITTING UNITS OF MESSAGES IN A MOBILE COMMUNICATION SYSTEM

CROSS-REFERENCE TO RELATED APPLICATIONS

Pursuant to 35 U.S.C. §119(a), this application claims the benefit of earlier filing date and right of priority to Korean Application No. 10-2004-00020129, filed on Mar. 24, 2004, and No. 10-2005-00019762, filed on Mar. 9, 2005, the contents of which are hereby incorporated by reference herein in its entirety.

BACKGROUND OF THE INVENTION

1. Field of the Invention

The present invention relates to communicating messages within a mobile communication system, and particularly, to transmitting units of a message between a mobile terminal and a server and automatically re-transmitting units that have errors generated during the message transmission.

2. Description of the Related Art

In general, a Multimedia Messaging Service (MMS) sends and receives messages containing various multimedia contents such as text messages, pictures, sounds and short videos. A user may send a relatively high bit rate MMS message to another party's terminal.

The MMS is the evolution of Short Message Service (SMS) for communicating text messages, and is based on methods used to send SMS messages. In the related art, when a user sends an MMS message to another terminal using a mobile communication terminal, data of the message is sent at once via an MMS Center (MMSC), which functions as an intermediate baseband communication link.

If a call is disconnected or a network error is generated during MMS message transmission, the entire MMS message is re-transmitted from either the transmitting terminal to the MMSC or from the MMSC to a receiving terminal. The re-transmission of MMS message results in inefficient use of wireless resources. Thus, a method or system is needed to overcome this shortcoming.

SUMMARY OF THE INVENTION

A method for communicating a multimedia messaging service message is disclosed. In accordance with one embodiment, a method of multimedia communication in a mobile communications network comprises allocating data in a message to be transmitted via a multimedia messaging service (MMS) protocol to a sequence of protocol data units (PDU), wherein each PDU in the sequence is associated with a sequence number identifying the position of the PDU in said sequence; transmitting a first PDU in said sequence; transmitting a subsequent PDU in the sequence according to the PDU's sequence number from a transmitting terminal, in response to an acknowledgment received confirming receipt of a previously transmitted PDU; retransmitting a PDU if a respective acknowledgement is not received for the PDU.

The method may further comprise correcting an error in communication if an acknowledgement is not received for a corresponding PDU. Each PDU comprises a data field for indicating the sequence number of the PDU. A zero value, for example, is assigned to the data field for the first PDU in one embodiment. In another embodiment, no value is assigned to the data field for the first PDU. The first PDU may also comprise a data field for indicating total number of the PDUs in said sequence.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and incorporated herein constitute a part of the application, illustrate embodiment(s) of the invention and together with the description serve to explain the principle of the invention.

Reference will now be made in detail to the preferred embodiments of the present invention, examples of which are illustrated in the accompanying drawings. Wherever possible, the same reference numbers will be used throughout the drawings to refer to the same or like parts.

DETAILED DESCRIPTION OF THE INVENTION

Figure 1:
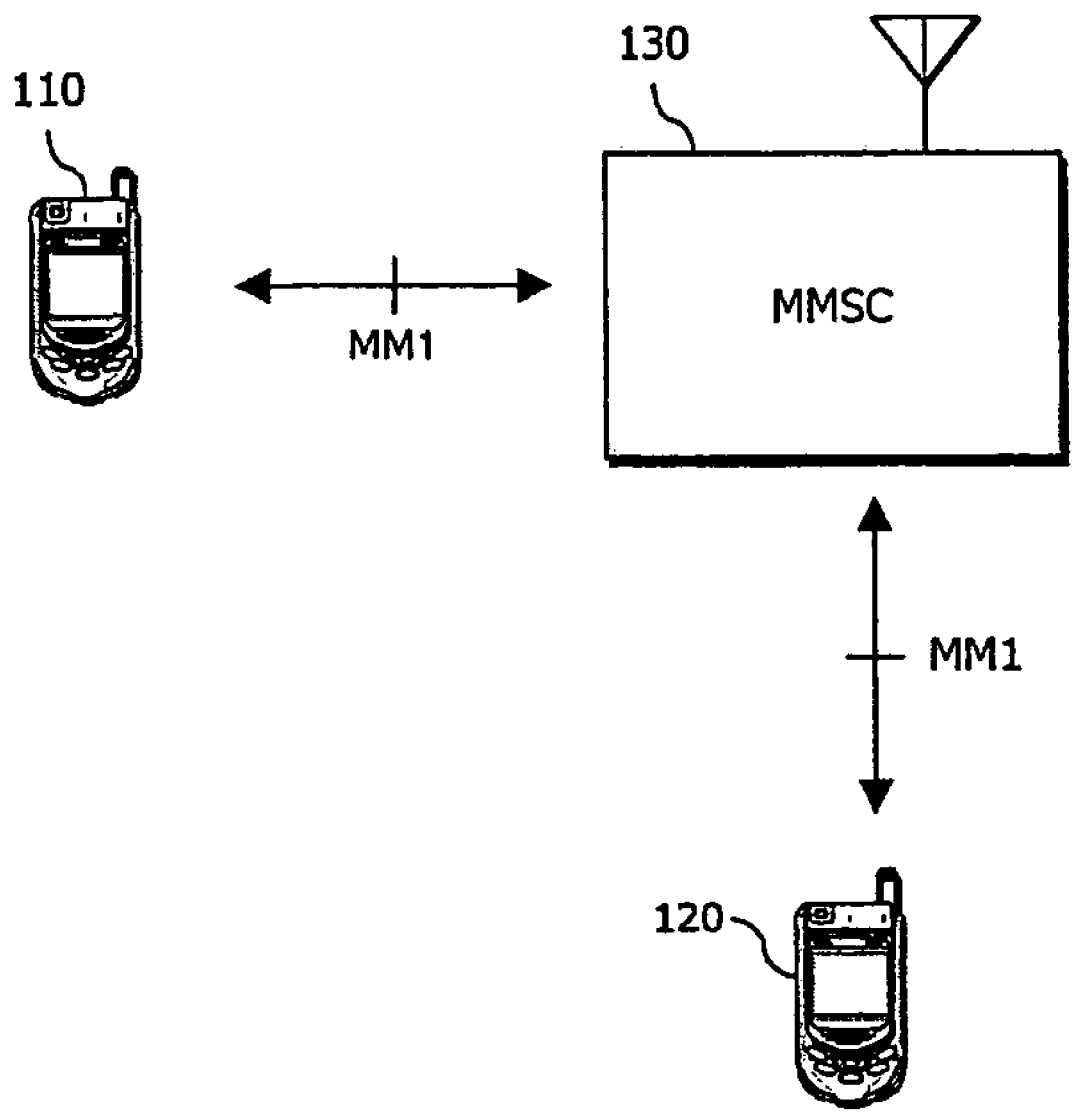
FIG. 1 illustrates one example of a general mobile communication environment in which the present invention may be employed.

Referring to FIG. 1, an exemplary embodiment is a mobile communication system that comprises mobile communication terminals 110, 120 and an MMSC 130. The mobile communication terminals 110, 120 and the MMSC 130 communicate messages and data through an application layer protocol. In this exemplary embodiment, the application layer protocol is MM1. The MM1 is a seventh layer application protocol utilized for information exchange between application programs through a network. The MM1 is defined as an interface between a mobile communication terminal and an MMSC by 3GPP (3rd Generation Partnership Project).

Figure 2:
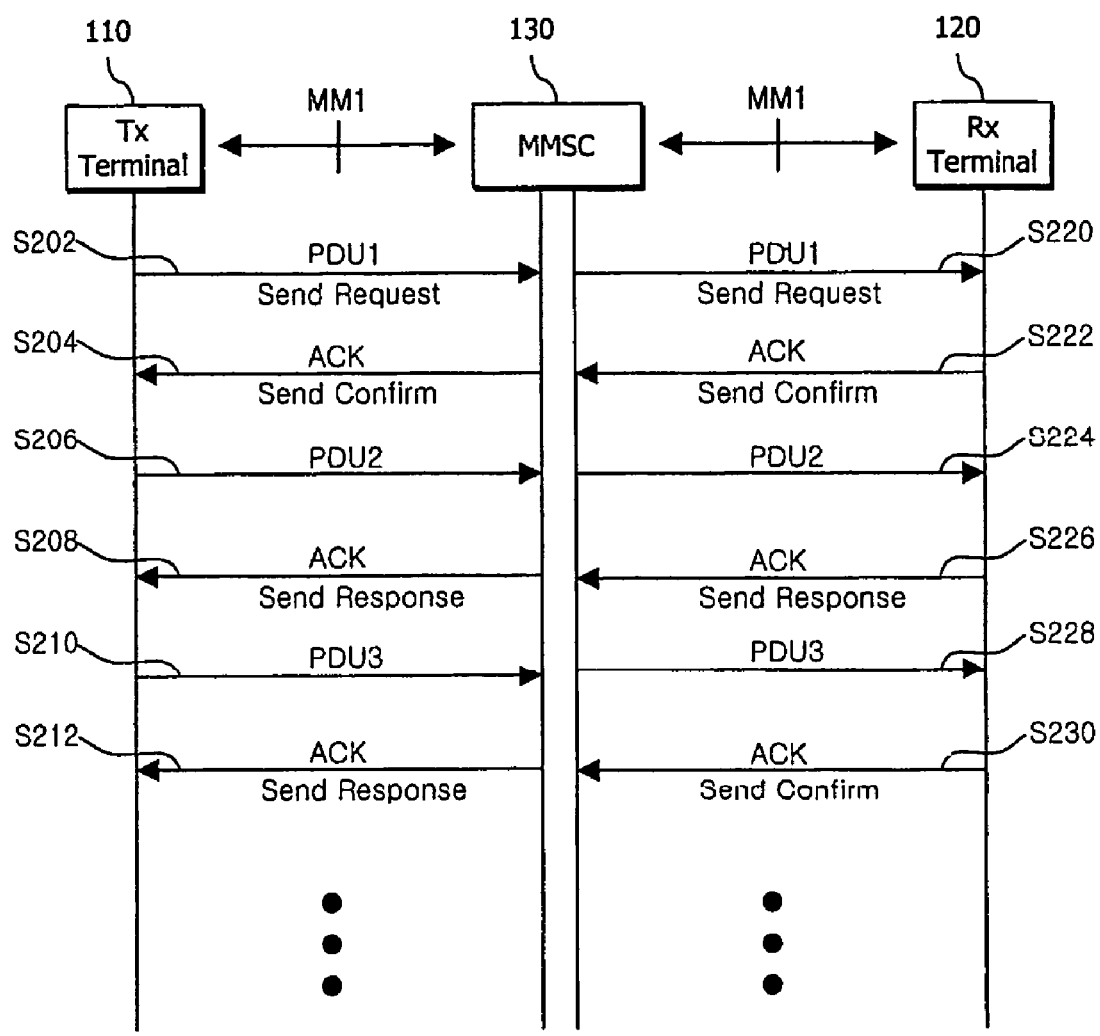
FIG. 2 is a block diagram illustrating a method of sending a MMS message in accordance with one embodiment of the present invention.

Referring to FIG. 2, in an exemplary embodiment, a mobile communication system communicates a MMS message wherein data of the MMS message is allocated into protocol data units (PDUs). In this exemplary embodiment, the PDUs are sequentially transmitted to the MMSC 130. By adding the following information fields to each protocol data unit (PDU), as shown in Table 1, the MMSC 130 recognizes the contents of the MMS message and a sequential order of the PDUs.

TABLE 1

| Information Fields | Value |
| --- | --- |
| Field name | <X-Mms-packet-value> |
| Field value | <Packet-count-value> |
| Description | <Optional> |

Thus, by analyzing the contents of the information fields, the sequential order for a plurality of the PDUs is detected. When an error is generated during an MMS message transmission, the PDU generating the error is detected, and retransmission of the MMS message continues from the detected PDU.

One field value (e.g., <packet-count-value>) indicates a sequence number for each PDU. The field value added to the first PDU may be zero. In an alternative embodiment, no field value may be designated. Thus, in one example, the PDUs are sent according to a set of sequential numbers, such as 0, 1, 2, 3, . . . . The PDU that has a first field value of zero is the first PDU in one exemplary embodiment. In another example, if the PDUs are sent according to their sequential numbers, such as 1, 2, 3, . . . , no value is associated with the first field. In one embodiment, the first PDU comprises a header field, which contains information on the contents and size of the message.

Message transmission starts when a transmitting terminal 110 (e.g., Tx Terminal 110) transmits a first PDU (PDU1), which includes a transmission request to the MMSC 130 (S202). MMSC 130 receives the PDU1 and references the header field of the PDU1 to determine the content of the message and the total number of PDUs in the transmitted message. MMSC 130 determines that the received PDU is the first of the PDUs by referring to the respective information field.

In one embodiment, MMSC 130 checks the information fields and sends to the transmitting terminal 110 an acknowledge signal (ACK) confirming that the MMSC 130 has transmitted the message and has successfully received the PDU (S204). An information field is contained in the ACK. Accordingly, the terminal or the MMSC, which receives an ACK, receives the number of successfully transmitted PDUs.

The transmitting terminal 110 receives the ACK and transmits a second PDU (e.g., PDU2) (S206). The MMSC 130 receives PDU2 and transmits an ACK to the transmitting terminal 110 (S208). The transmitting terminal 110, which has received the ACK, transmits a third PDU (e.g., PDU3) to the MMSC 130 (S210), and respectively receives an ACK from the MMSC 130 (S212). If an error is not generated during the transmission of PDUs and the ACK, the MMS message transmission, it is determined that the entire message is successfully transmitted once the last PDU and ACK are transmitted.

Referring back to FIG. 2, once MMSC 130 has received the last PDU, it transmits the received MMS message to the receiving terminal 120. In one embodiment, the MMSC 130 transmits PDU1 comprising a transmission request, i.e., send request, to the receiving terminal 120 (S220). As mentioned above, the PDU1 may have no field value or the field value of 0 depending on implementation to indicate that PDU1 is the first PDU in a sequence of PDUs included in the MMS message.

The receiving terminal 120 (e.g., Rx Terminal 120) receives the contents of the message and determines the number of PDUs in the message by referring to the header field of PDU1. The receiving terminal 120 checks the information fields and sends to MMSC 130 an acknowledge signal (ACK) to confirm message transmission and normal reception of the PDU (S222).

The MMSC 130 receives the ACK and transmits the second PDU (e.g., PDU2) (S224). The receiving terminal 120 receives PDU2 and transmits an ACK to MMSC 130 (S226). The MMSC 130 receives the ACK and transmits the third PDU (e.g., PDU3) (S228). MMSC 130 receives an ACK from the receiving terminal 120 (S230). If the PDUs and the ACKs are sequentially transmitted, as described above, and an error is not generated until the final PDU and the following ACK are transmitted, the MMS message transmission of the receiving terminal 120 is successfully completed.

Figure 3:
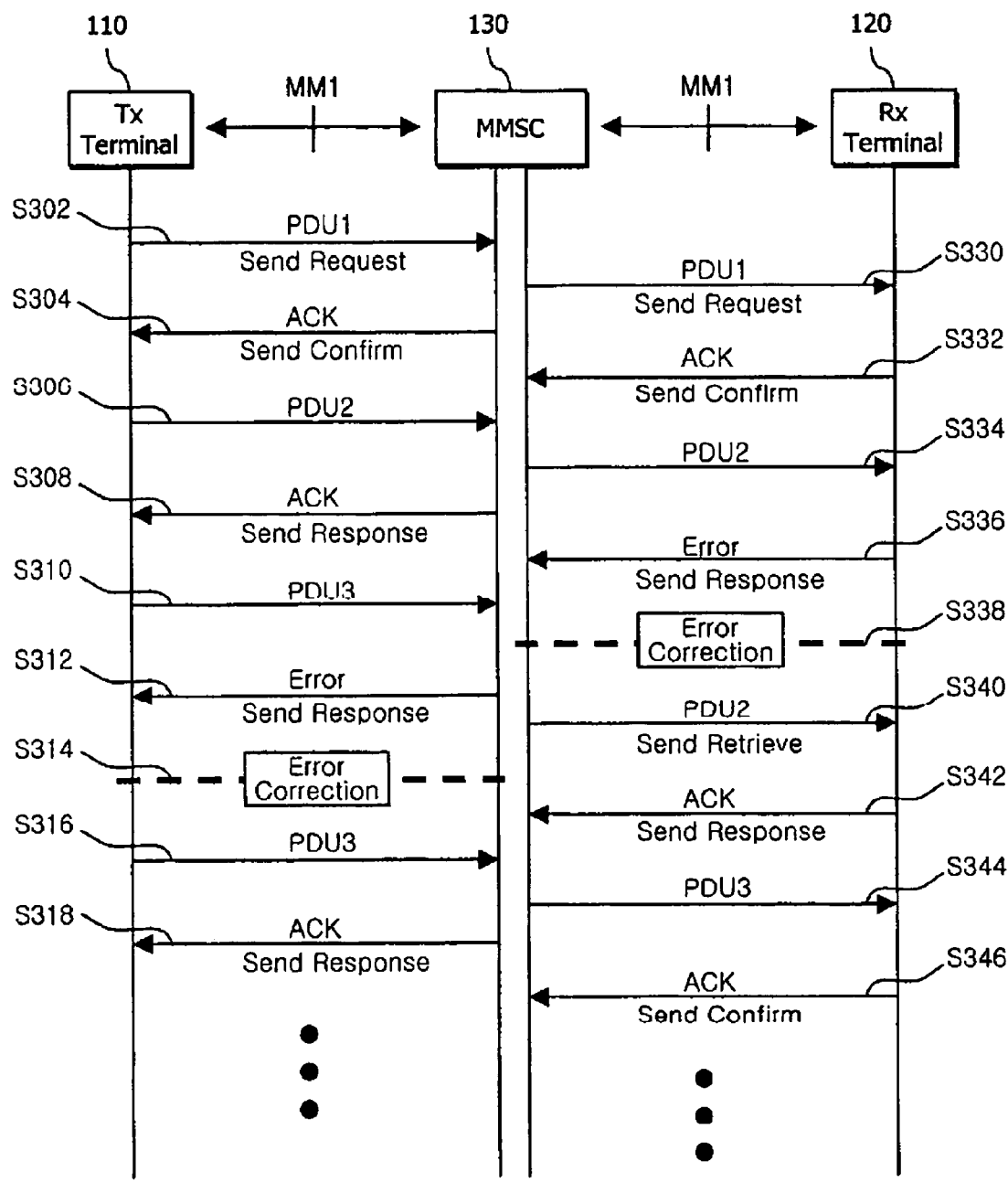
FIG. 3 is a block diagram illustrating a method of sending a MMS message in accordance with another embodiment of the present invention.

Referring to FIG. 3, to indicate that message transmission is started, the transmitting terminal 110 transmits PDU1 that includes a transmission request, (i.e., send request) to MMSC 130 (S302). MMSC 130 determines the contents of the message and the number of PDUs (i.e., the size of the message) by reference to a header field of PDU1. MMSC 130 determines from the information field, if the received PDU is the first of the PDUs.

MMSC 130 checks the information field and sends an ACK to the transmitting terminal 110 that the MMSC 130 has confirmed the message transmission and has successfully received the PDU (S304). An information field is included in the ACK. The terminal or the MMSC receives an ACK and determines the number of PDUs that have been successfully transmitted.

The transmitting terminal 110 receives the ACK and transmits PDU2 (S306). The MMSC 130 receives the PDU 2 and transmits an ACK to the transmitting terminal 110 (S308). The transmitting terminal 110 that received the ACK transmits PDU3 (S310). If MMSC 130 does not successfully receive PDU3 as a call switch, a network error has occurred during transmission.

In a preferred embodiment, MMSC 130 creates a response message that comprises error information value (e.g., <Error-message-sending-count>) or an <X-Mms-packet-value>). MMSC 130 constitutes a field name area, instead of transmitting an ACK with respect to PDU3, and transmits the response message to the transmitting terminal 110 (S312). The transmitting terminal 110 recognizes the generation of the error from the error information value, and temporarily stops transmission of the PDU.

In one embodiment, transmitting terminal 110 recognizes which PDU has generated an error, determines a cause or causes of one or more errors that are generated between a transmitting terminal (e.g., terminal 110) and a receiving terminal (e.g., MMSC 130) and corrects the cause or causes of one or more errors at the application protocol layer (S314). If the error cannot be corrected immediately (e.g. a network error) then the transmitting terminal 110 stops the MMS message transmission, and notifies a user that message transmission has been stopped and the reason why it has been stopped.

If the causes of the error generation are corrected, the transmitting terminal 110 determines which of the PDU from the error information value included in the response message, is causing the error. The transmitting terminal 110 resumes message transmission from, for example, PDU3 (S316) and receives an ACK from the MMSC 130 (S318). If the PDUs and the following ACK are sequentially transmitted, as described above, and an error is not generated, then the PDU and the following ACK have been successfully transmitted.

To begin message transmission between MMSC 130 and a receiving terminal 120, MMSC 130 transmits PDU1 comprising a transmission request to the receiving terminal 120

(S330). The receiving terminal 120, which has received the PDU1, knows the contents of the message, the number of PDUs, which comprise the entire message, through reference to the header field of PDU1. The receiving terminal 120 determines if the received PDU is the first of the PDUs by referring to the information field. The terminal 120 determines the information field, and sends to MMSC 130 an acknowledge signal (ACK) that the terminal 120 has confirmed the message transmission and has successfully received the PDU (S332).

MMSC 130 receives the ACK and transmits PDU2) (S334). If the receiving terminal 120 does not successfully receive PDU2 as a call switch, then a network error or the like has occurred during transmission. In this case, the receiving terminal 120 has an error information value such as <Error-message-sending-count> or an <X-Mms-packet-value>, which constitutes a field name area of a response message. The error information value, instead of an ACK, is transmitted to MMSC 130 in response to the third PDU (S336). The MMSC 130 recognizes the error message, and temporarily stops the transmission of the PDU.

Accordingly, MMSC 130 recognizes which PDU has generated the error, finds the causes or cause of one or more errors generated between a transmitting terminal 110 and a receiving terminal (e.g., MMSC 130) and corrects the cause or causes of one of more errors at the application protocol layer (S338). If the error cannot be corrected immediately such as due to a network error, the MMSC 130 stops the MMS message transmission, and notifies a user that the message transmission has been stopped and the reason message transmission has stopped.

If the causes of the error are corrected, the MMSC 130 checks which PDU the transmission was stopped at through reference to the error information value included in the response message, resumes transmission beginning with the second PDU, which includes transmission retrieve and receives an ACK from the MMSC 130 (S342).

In one embodiment, MMSC 130 receives the ACK and transmits PDU3 (S344). MMSC 130 waits to receive an ACK from the receiving terminal 120 (S346). If the PDUs and the following ACK are successfully transmitted when an error is not generated upon transmission of the PDU and the following ACK.

Figure 4:
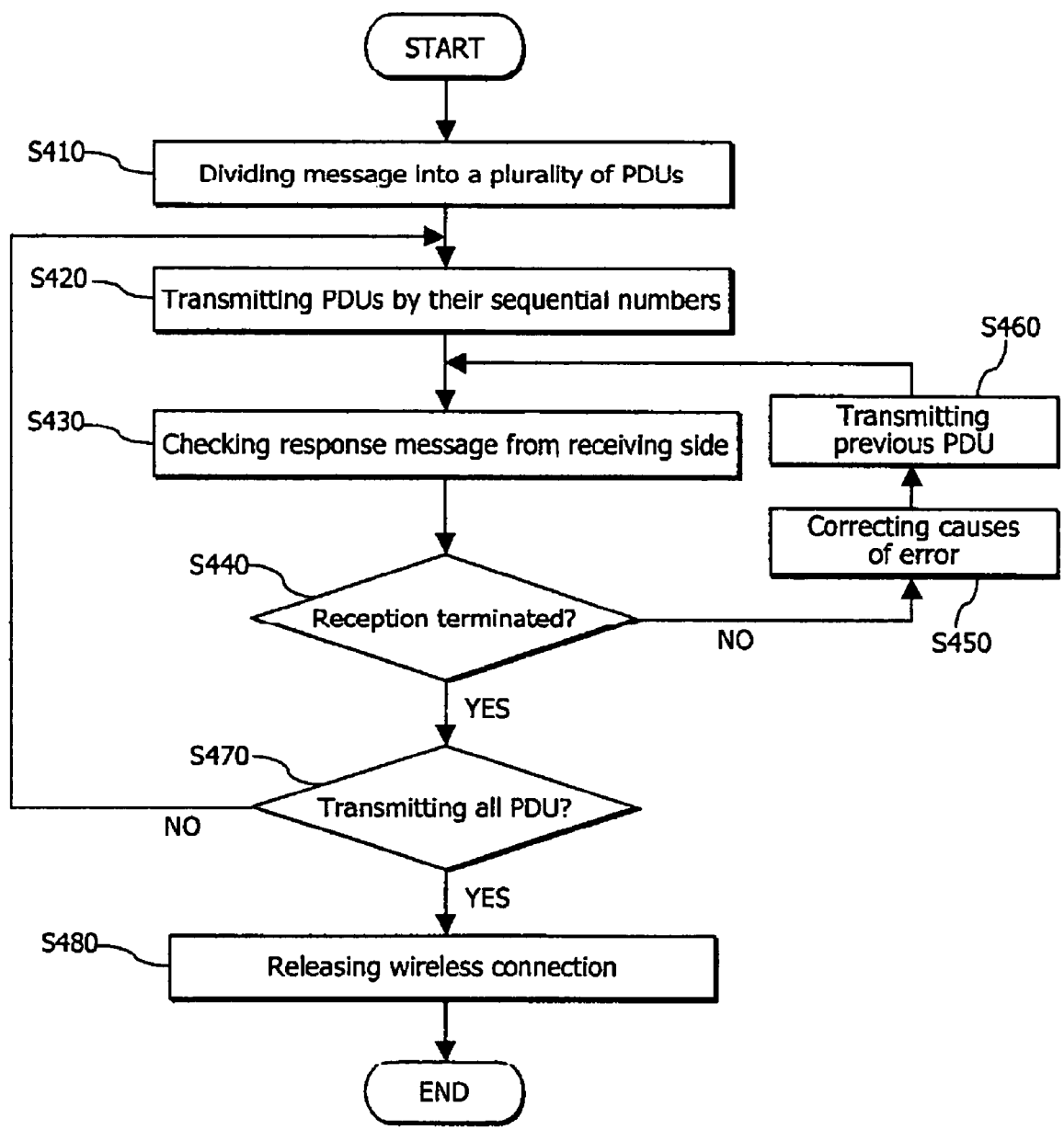
FIG. 4 is a flow chart that illustrates transmission of a MMS message in units and automatic re-transmission thereof in accordance with one embodiment of the present invention.

Referring to FIG. 4, when the transmission of an MMS message is set for the first time, a transmitting terminal divides the MMS message into a plurality of PDUs of an MM1 Protocol (S410), and transmits preferably in a sequential order the plurality of PDUs (S420).

Whenever sending a PDU, the transmitting terminal checks a response message from a receiving terminal (S430), and determines whether the response message is sent to indicate that the reception of the PDU has been completed or not (S440).

If the response message is sent to indicate that the reception of the PDU has not been completed, the transmitting terminal stops the PDU transmission, finds causes of the error generation between the transmitting terminal and the receiving terminal, corrects the causes of error (S450), and resumes the PDU transmission from the last transmitted PDU (S460).

If the response message is sent to indicate that the reception of the PDU has been completed, the transmitting terminal determines whether the transmission of every PDU is completed (S470). If the transmission has not been completed yet, the process of transmitting PDUs in sequential order is performed again, and the process (S420-S47) is repeated. Upon completing transmission of the PDUs, the MMS message transmission is terminated and the wireless connection is released (S480).

As so far described, the present invention transmits an MMS message upon dividing and automatically re-transmitting PDUs when an error is generated during transmission of a MMS message. The re-transmission is started from the last transmitted PDU, where the error was generated, without re-transmitting the entire message so that wireless resources are more efficiently utilized.

An error generated during message transmission, in the present invention, is corrected at the application layer, and automatic re-transmission of the message is performed so that an error generated not only from the corresponding layer but also from a lower layer may be checked and corrected.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of multimedia communication in a mobile communications network, the method comprising:
    allocating data in a message to be transmitted via a multimedia messaging service (MMS) protocol to a sequence of protocol data units (PDUs), wherein each PDU in the sequence is associated with a sequence number identifying a position of the PDU in the sequence;
    transmitting a first PDU in the sequence, the first PDU containing a transmission request comprising contents of the message and a total number of the PDUs in the sequence;
    transmitting a subsequent PDU in the sequence according to the PDU's sequence number, in response to an acknowledgment received, confirming receipt of the previously transmitted last PDU; and
    retransmitting the last transmitted PDU if a respective acknowledgement is not received for the previously transmitted last PDU,
    wherein the acknowledgment contains information regarding a number of at least one successfully transmitted PDU,
    wherein the PDUs are transmitted and retransmitted from a transmitting terminal to an MMS Center (MMSC) connected to the mobile communication network,
    wherein the PDUs are transmitted and retransmitted from the MMSC to a receiving terminal connected to the mobile communication network,
    wherein the message is transmitted from the same MMSC to the receiving terminal after receiving a last PDU from the transmitting terminal connected to the mobile communication network, the same PDUs received from the transmitting terminal transmitted sequentially to the receiving terminal, starting from the same first PDU,
    wherein each PDU comprises a data field for indicating the sequence number of the PDU and a zero value is assigned to the data field for the first PDU or no value is assigned to the data field for the first PDU, and
    wherein the first PDU comprises a data field for indicating the total number of the PDUs in the sequence.

2. The method of claim 1, further comprising:
correcting an error in the communication if the acknowledgement is not received for the previously transmitted last PDU before retransmitting the previously transmitted last PDU; and
stopping the message transmission and displaying a message indicating why the transmission has been stopped if the error cannot be corrected immediately.

3. The method of claim 1, further comprising:
determining an error in the communication requiring the retransmission of the previously transmitted last PDU.

4. The method of claim 3, further comprising:
correcting the error in the communication.

5. A method for communicating a multimedia messaging service (MMS) message, the method comprising:
dividing the MMS message received from a transmitting terminal into a plurality of protocol data units (PDUs) of an application layer protocol;
transmitting the plurality of PDUs to a receiving terminal sequentially;
checking a response message sent from the receiving terminal upon transmission of each of the plurality of PDUs;
transmitting a subsequent one of the plurality of PDUs when the response message confirms receipt of a previously transmitted last one of the plurality of PDUs, the response message containing information regarding a number of at least one successfully transmitted PDU;
stopping the transmission of the plurality of PDUs when an error message related to a message transmission error is contained in the response message after transmitting the previously transmitted last one of the plurality of PDUs;
correcting the message transmission error generated between the transmitting terminal and the receiving terminal at a protocol data layer; and
retransmitting the MMS message starting from the previously transmitted last one of the plurality of PDUs after correcting the message transmission error,
wherein the plurality of PDUs are transmitted one by one according to an order of sequence numbers associated with each of the plurality of PDUs, and a first PDU among the plurality of PDUs contains a transmission request comprising contents of the MMS message and a total number of the sequence numbers included in the plurality of PDUs,
wherein the plurality of PDUs are transmitted and retransmitted from a transmitting terminal to an MMS Center (MMSC),
wherein the plurality of PDUs are transmitted and retransmitted from the MMSC to a receiving terminal,
wherein the message is transmitted from the same MMSC to the receiving terminal after receiving a last PDU from the transmitting terminal, the same plurality of PDUs received from the transmitting terminal transmitted sequentially to the receiving terminal, starting from the same first PDU,
wherein each of the plurality of PDUs comprises an information field comprising a sequence number and the first PDU has a field value of zero to indicate a first sequence number of the plurality of PDUs or the first PDU has a field with no value, and
wherein the information field comprises:
a field name for indicating a field attribute;
a field value for indicating the sequence number of the PDU; and
a description for indicating a field type.

6. The method of claim 5, further comprising:
stopping the MMS message transmission when the message transmission error cannot be corrected immediately; and
displaying a message indicating why the transmission has been stopped,
wherein the response message related to the message transmission error has a field value indicating that a transmission error has occurred.

7. The method of claim 5, further comprising:
transmitting a next PDU if no error message is contained in the response message.

8. The method of claim 7, wherein the response message that contains no error message is an acknowledge signal indicating that the receiving terminal has successfully received the MMS message.

9. A system for communicating a multimedia messaging service (MMS) message, the system comprising:
a transceiver unit for:
dividing the MMS message sent from a transmitting terminal into a plurality of (PDUs) of an application layer protocol;
transmitting the plurality of PDUs sequentially;
checking a response message sent from a receiving terminal upon transmission of each of the plurality of PDUs;
transmitting a next one of the plurality of PDUs when the response message confirms receipt of a previously transmitted last one of the plurality of PDUs, the response message containing information regarding a number of at least one successfully transmitted PDU;
stopping the transmission of the plurality of PDUs when an error message related to a message transmission error is contained in the response message after transmitting the previously transmitted last one of the plurality of PDUs;
correcting the message transmission error generated between the transmitting terminal and the receiving terminal at a protocol data layer;
retransmitting the MMS message from the previously transmitted last one of the plurality of PDUs;
transmitting the next one of the plurality of PDUs if the response message is not related to the message transmission error;
receiving a final response message having an acknowledge signal from the receiving terminal after transmitting a final one of the plurality of PDUs; and
releasing a wireless connection after the plurality of PDUs have been transmitted,
wherein the plurality of PDUs are transmitted one by one according to an order of sequence numbers associated with each of the plurality of PDUs, and a first PDU among the plurality of PDUs contains a transmission request comprising contents of the MMS message and a total number of the sequence numbers included in the plurality of PDUs,
wherein the plurality of PDUs are transmitted and retransmitted from the transmitting terminal to an MMS Center (MMSC),
wherein the plurality of PDUs are transmitted and retransmitted from the MMSC to the receiving terminal, wherein the message is transmitted from the same MMSC to the receiving terminal after receiving a last PDU from the transmitting terminal, the same plurality of PDUs received from the transmitting terminal transmitted sequentially to the receiving terminal, starting from the same first PDU, wherein each of the plurality of PDUs comprises a data field for indicating a sequence number of the PDU and a zero value is assigned to the data field for the first PDU or no value is assigned to the data field for the first PDU, and wherein the first PDU comprises a data field for indicating the total number of the plurality of PDUs that are transmitted sequentially.

10. The method of claim 9, wherein the transmitting terminal stops the MMS message transmission if the message transmission error cannot be corrected immediately, the method further comprising:

displaying a message to indicate why the transmission has been stopped.

* * * * *